United States Patent
Belley et al.

(10) Patent No.: US 11,851,309 B2
(45) Date of Patent: Dec. 26, 2023

(54) SHOVEL LIFTING SYSTEM AND METHOD

(71) Applicant: 8082464 CANADA INC., Québec (CA)

(72) Inventors: Robin Belley, Québec (CA); Christian Belley, Québec (CA)

(73) Assignee: 8082464 CANADA INC., Quebec (CA)

( * ) Notice: Subject to any disclaimer, the term of this patent is extended or adjusted under 35 U.S.C. 154(b) by 923 days.

(21) Appl. No.: 16/606,311

(22) PCT Filed: Apr. 30, 2018

(86) PCT No.: PCT/CA2018/050503
§ 371 (c)(1),
(2) Date: Oct. 18, 2019

(87) PCT Pub. No.: WO2018/201236
PCT Pub. Date: Nov. 8, 2018

(65) Prior Publication Data
US 2020/0122987 A1 Apr. 23, 2020

Related U.S. Application Data

(60) Provisional application No. 62/500,642, filed on May 3, 2017.

(51) Int. Cl.
*B66F 3/46* (2006.01)
*E02F 9/08* (2006.01)
(Continued)

(52) U.S. Cl.
CPC .............. *B66F 3/46* (2013.01); *E02F 3/3631* (2013.01); *E02F 9/08* (2013.01); *G05B 19/058* (2013.01); *B66F 2700/05* (2013.01)

(58) Field of Classification Search
CPC .......... B66F 3/46; E02F 9/0808; E02F 9/0833
See application file for complete search history.

(56) References Cited

U.S. PATENT DOCUMENTS 2,958,508 A * 11/1960 Martinez ................. E02F 9/003
254/89 R
3,881,687 A * 5/1975 Johansson ........... E02B 17/0863
254/108
(Continued)

FOREIGN PATENT DOCUMENTS

CA 2967492 A1 6/2016
CA 2980365 A1 * 6/2016 ................ B66F 3/46
(Continued)

OTHER PUBLICATIONS

Int'l Search Report and Written Opinion dated Jul. 10, 2018 in Int'l Application No. PCT/CA2018/050503.
(Continued)

*Primary Examiner* — Barry Gooden, Jr.
(74) *Attorney, Agent, or Firm* — Panitch Schwarze Belsiario & Nadel LLP

(57) ABSTRACT

There is disclosed a lifting apparatus and a method for lifting a shovel including its upper part, its lower part, and its boom while the shovel handle and dipper remain on the ground. The lifting system may comprise six lifting devices arranged in three pairs that are disposed under the shovel on three lines: front, middle and rear (ref. FIG. 10), the rear line being under the shovel counterweight. The lifting system is connected to a power and control unit from which, through the use of a programmable logic controller and level detectors, metered hydraulic power is selectively applied at each lifting point in order to raise the shovel to a desired height while in doing so maintaining it level with a pre-set lifting plane throughout the entire operation.

26 Claims, 12 Drawing Sheets

(51) Int. Cl.
*G05B 19/05* (2006.01)
*E02F 3/36* (2006.01)

(56) References Cited

U.S. PATENT DOCUMENTS

| | | | | |
|---|---|---|---|---|
| 4,930,750 | A * | 6/1990 | De Castro | E04G 23/065 254/89 H |
| 6,193,219 | B1 * | 2/2001 | Belley | B66F 7/20 254/89 R |
| 6,543,331 | B1 * | 4/2003 | Zingerman | F15B 15/16 91/519 |
| 6,705,595 | B2 * | 3/2004 | Belley | E02F 9/003 254/108 |
| 7,343,846 | B2 * | 3/2008 | Stanford | F15B 15/24 92/18 |
| 9,015,969 | B2 * | 4/2015 | Knuth | E02F 3/42 37/444 |
| 9,223,302 | B2 * | 12/2015 | Maurer | H02P 29/60 |
| 10,472,095 | B1 * | 11/2019 | Vance | B25J 13/085 |
| 2001/0004109 | A1 * | 6/2001 | Belley | E02F 9/003 254/89 H |
| 2002/0017637 | A1 * | 2/2002 | Belley | E02F 9/003 254/89 H |
| 2013/0240300 | A1 * | 9/2013 | Fagan | B66F 7/10 187/203 |
| 2014/0324214 | A1 * | 10/2014 | Elliott | B66F 13/00 254/89 R |
| 2015/0076432 | A1 | 3/2015 | Farquharson | |
| 2015/0246797 | A1 * | 9/2015 | Jaipaul | B66F 3/46 700/213 |
| 2016/0152454 | A1 * | 6/2016 | Stapensea | B66F 17/00 254/89 R |
| 2017/0081158 | A1 * | 3/2017 | Jaipaul | H01Q 1/007 |
| 2017/0241126 | A1 * | 8/2017 | Konduc | E04B 1/3511 |
| 2018/0290634 | A1 * | 10/2018 | Belley | B66F 5/04 |
| 2019/0292028 | A1 * | 9/2019 | Sung | E02B 17/08 |
| 2019/0316417 | A1 * | 10/2019 | Krelifaoui | E21B 7/024 |
| 2020/0055555 | A1 * | 2/2020 | Williams | B66F 3/26 |
| 2020/0140247 | A1 * | 5/2020 | Jaipaul | H02J 7/00712 |
| 2020/0407204 | A1 * | 12/2020 | Hudson | B66F 3/46 |
| 2021/0119455 | A1 * | 4/2021 | Jaipaul | H02J 7/0013 |
| 2021/0122619 | A1 * | 4/2021 | De Jong | B66F 3/46 |
| 2021/0380379 | A1 * | 12/2021 | Nooren | B66F 7/16 |
| 2022/0048745 | A1 * | 2/2022 | Belley | B66F 3/46 |
| 2022/0185640 | A1 * | 6/2022 | Schiphorst | B66F 1/025 |

FOREIGN PATENT DOCUMENTS

| | | | | |
|---|---|---|---|---|
| CN | 102602846 | A | 7/2012 | |
| WO | WO-9852860 | A1 * | 11/1998 | B66F 7/20 |
| WO | WO-2014186868 | A1 * | 11/2014 | B66F 1/06 |
| WO | WO-2016095007 | A1 * | 6/2016 | B66F 3/46 |
| WO | WO-2018034646 | A1 * | 2/2018 | |
| WO | WO-2020198620 | A1 * | 10/2020 | B66F 1/025 |

OTHER PUBLICATIONS

"Underdecking a Rope Shovel with a Jack-up System" (Enerpac Heavy Lifting Technology) Sep. 23, 2016, URL: https://www.youtube.com/watch?v=SO9PtcyBVXc <https://urldefense.proofpoint.com/v2/url?u=https-3A__www.youtube.com_watch-3Fv-3DSO9PtcyBVXc&d=DwMGaQ&c=euGZstcaTDIIvimEN8b7jXrwqOf-v5A_CdpgnVfiiMM&r=ioG7cQwTSyz5gsnVaDNh6Q6KvbOPe_MBcdwwCA_68xg&m=RrLLKOdrSbng6j65LKO77dcyHvhOJEde-Hc9yqDnhDY&s=vUIVzUM7FNK0xKA-LP7YM-Sx2rpysXNtEVQrkkjOjKo&e=>.

* cited by examiner

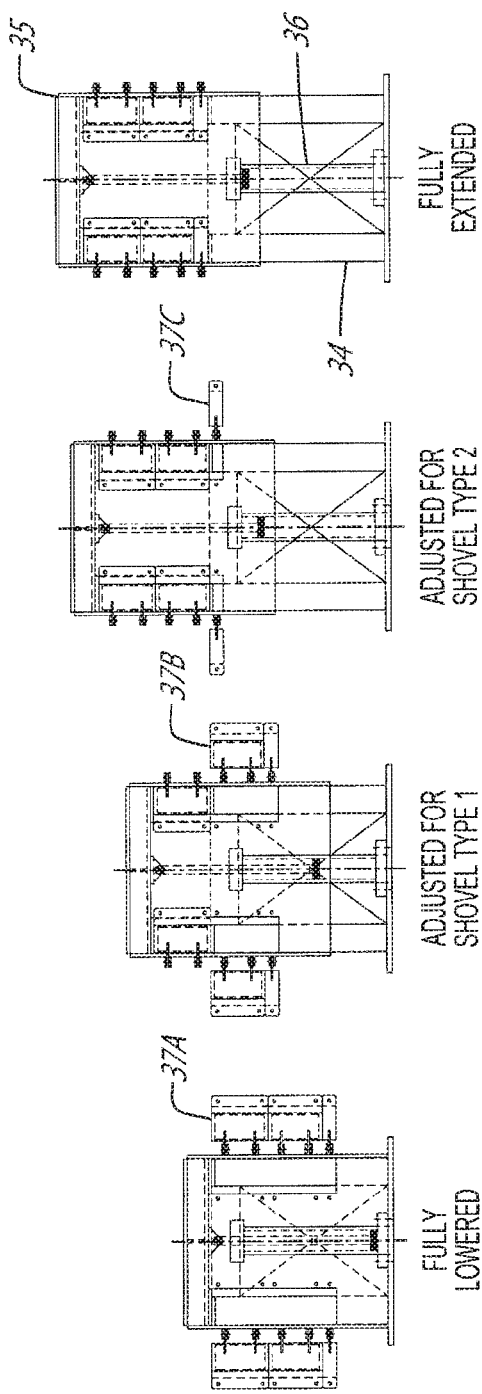
FIG. 6
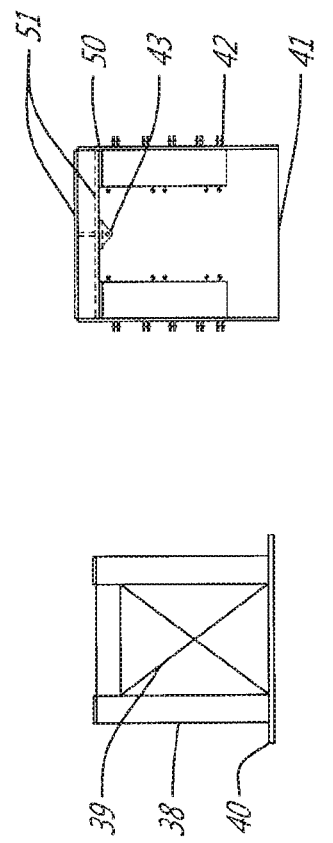
FIG. 6-1
FIG. 6-2

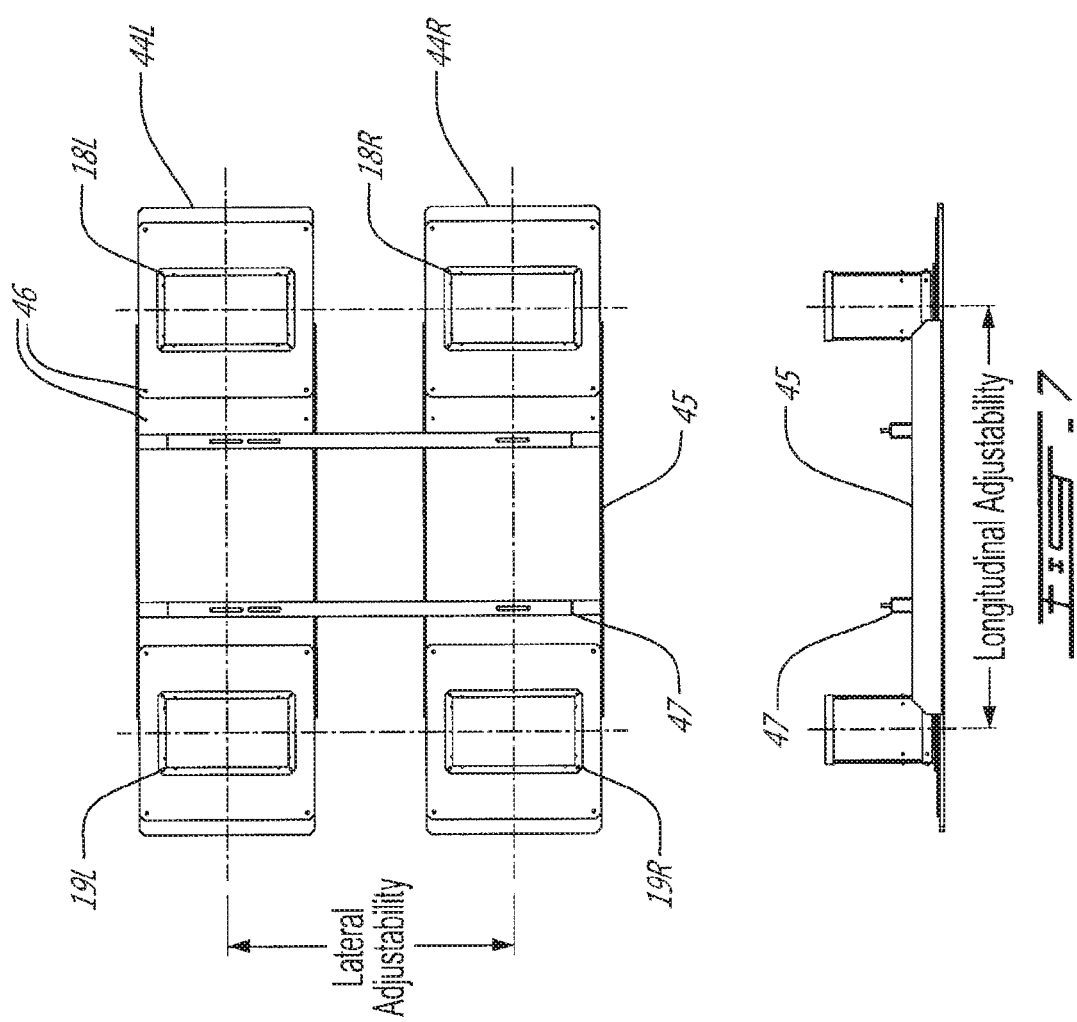

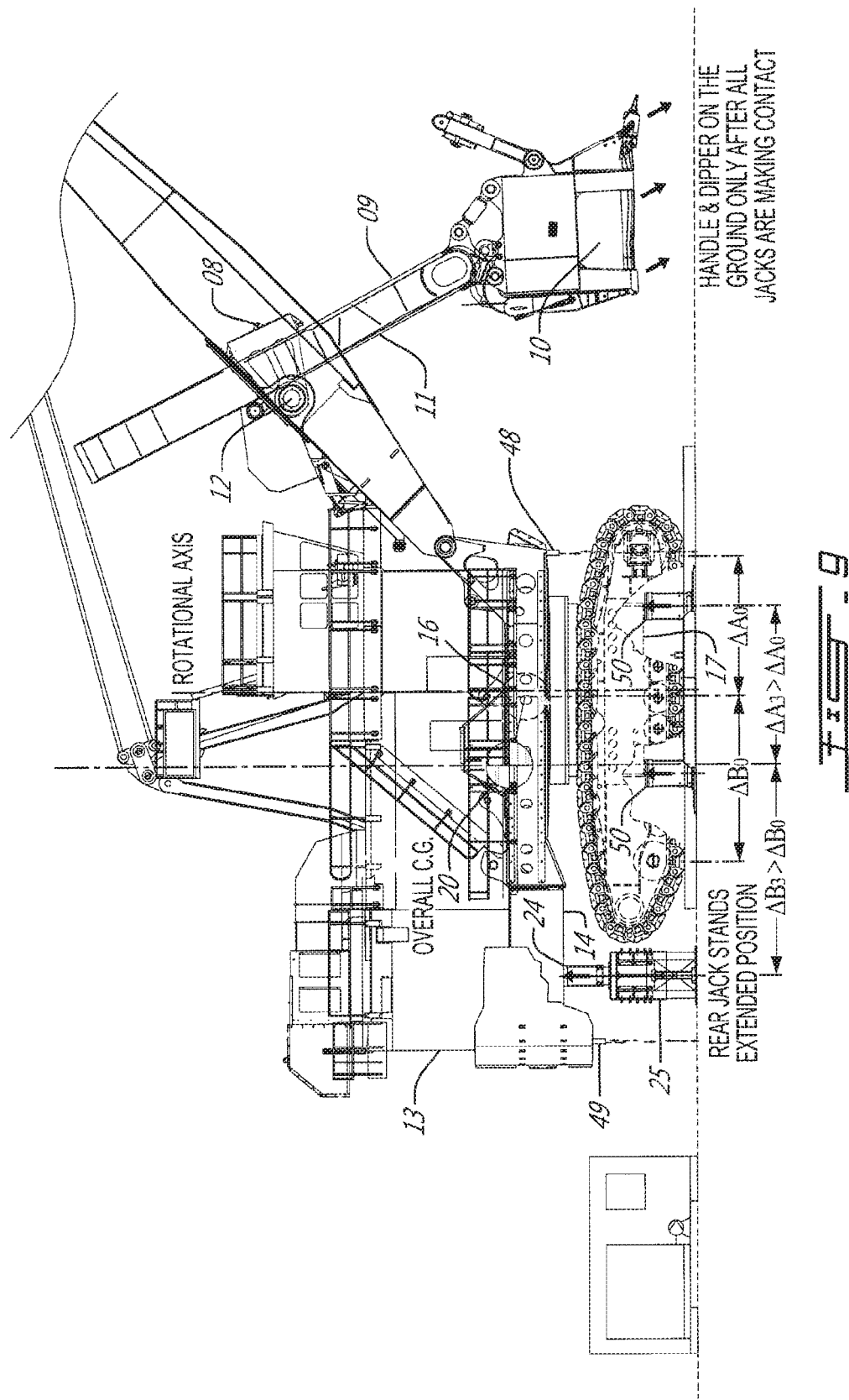

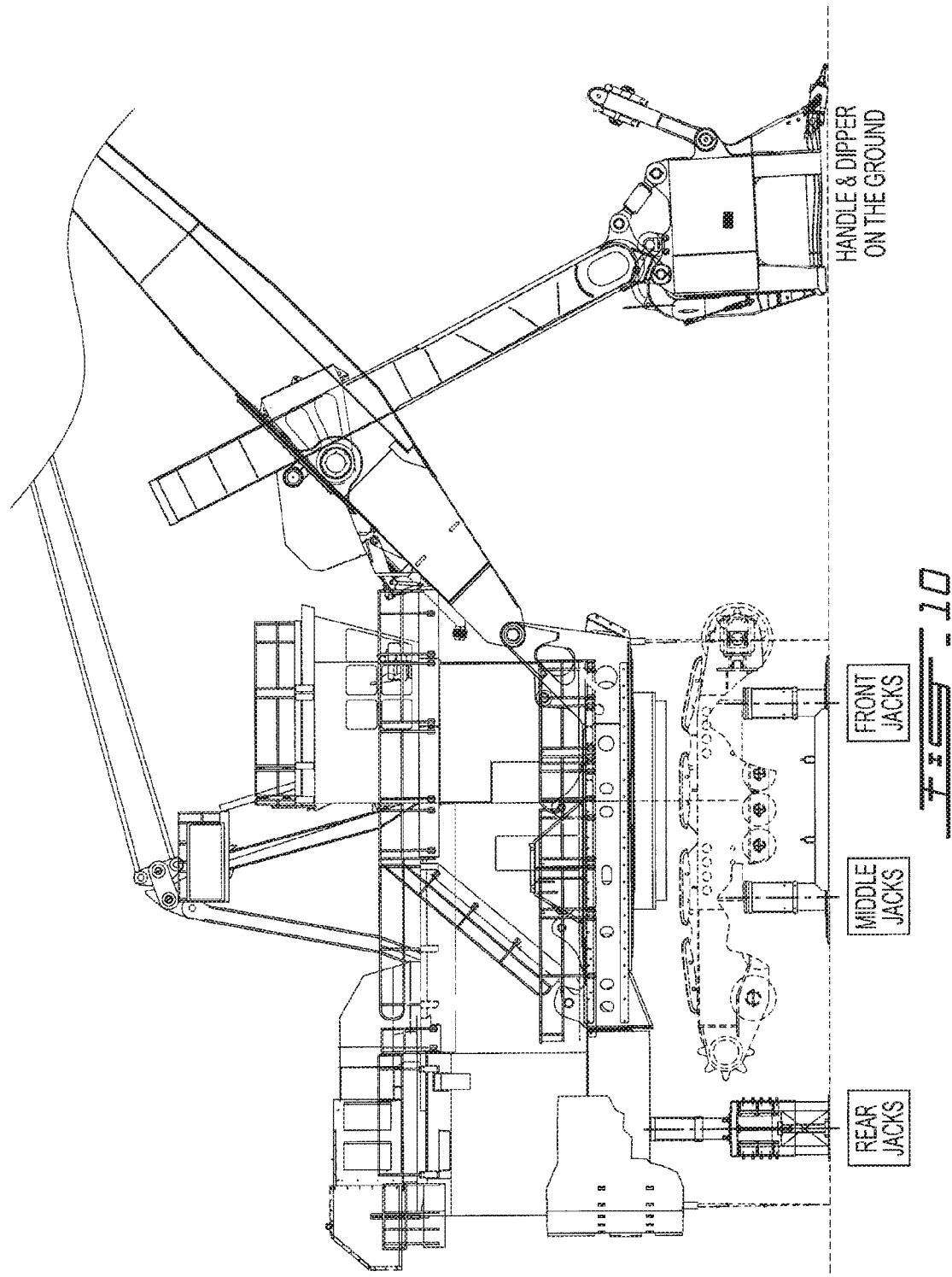

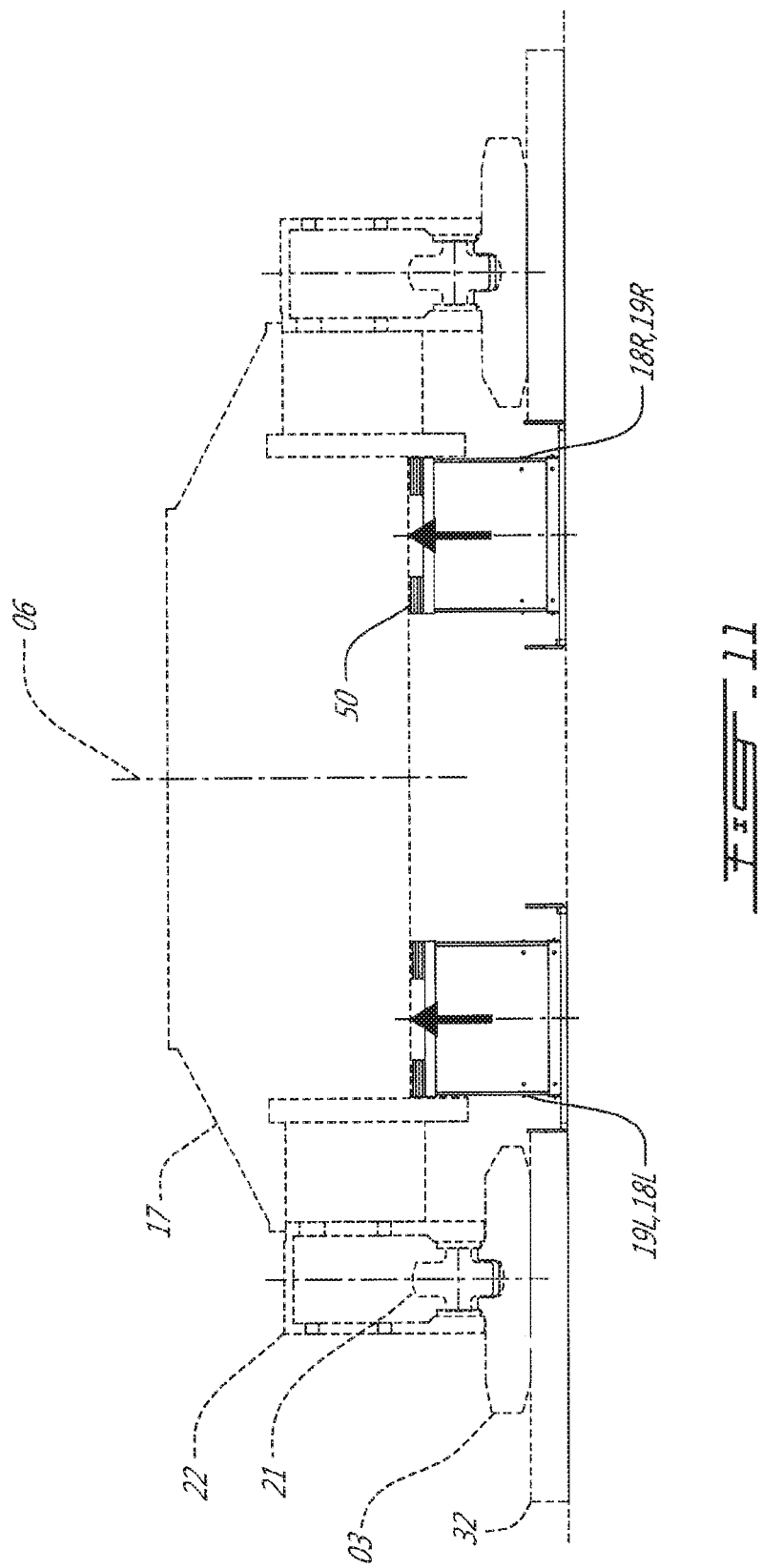

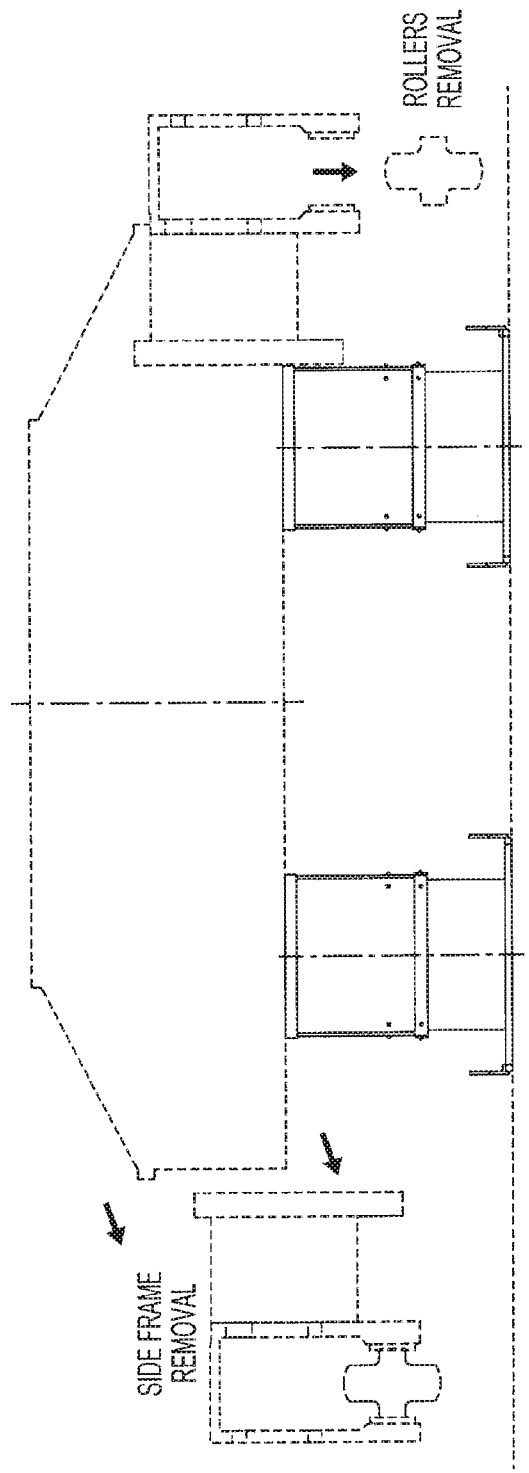

SHOVEL LIFTING SYSTEM AND METHOD

CROSS-REFERENCE TO RELATED APPLICATIONS

This application is a Section 371 of International Application No. PCT/CA2018/050503, filed Apr. 30, 2018, which was published on Nov. 8, 2018 under International Publication No. WO 2018/201236 A1, which claims the benefit under 35 U.S.C. § 119(e) of U.S. Provisional Patent Application No. 62/500,642, which was filed May 3, 2017, the entirety of the aforementioned applications are incorporated herein by reference.

TECHNICAL FIELD

The application relates to a lifting system and method allowing to safely raise a shovel as a whole above ground while maintaining it level be it to the ground or any other plane that could be desired.

BACKGROUND ART

Routine maintenance often requires that heavy equipment such as mechanical shovels be raised in elevation. This allows maintenance crews to access the lower components of the heavy equipment so as to perform maintenance and repairs, and saves time and effort by avoiding having to dismantle the heavy equipment.

Consider the example of a large mechanical or electrical shovel having a lower carbody or tractor which uses continuous track motion to displace the shovel. In order to repair or replace the sideframe of the carbody, its treads, or the rollers which turn the treads, it would be desirable to access these components without having to first separate them from the carbody. This can be done by raising the shovel as a whole.

SUMMARY

There is described herein a method for lifting a shovel from a ground surface. The method comprises:
Lifting a shovel as a whole above ground:
  while its dipper remains on the ground for the duration of the lift and maintenance work,
  using at least six (6) jacking points, four (4) of which are located underneath the main frame of the carbody while the two (2) others are located underneath the counterweight of the shovel,
  where the whole lifting system can be pre-assembled, positioned, hooked up and stand ready to operate on a specific shovel dimensions and characteristics,
  where the shovel can be moved over the lifting system without interfering with any of its components, and in particular where the height of the rear jack stands is adjustable to prevent these jacks from interfering with the shovel's counterweight slabs.

In accordance with a general aspect, the shovel is lifted as a whole using a systemized approach where:
  all jacking points are monitored and working in unison through the use of a Programmable Logic Controller (PLC),
  the PLC uses field data to make calculations and adjustments for each jacking point in order to:
    maintain a current lifting plane parallel to the initial lifting plane,
    compensate for local ground settling/deformations under load,
    maintain an even pressure in the jacks underneath the carbody to minimize reactions to the carbody.

In accordance to another aspect, the PLC uses field data such as:
  Distance measurements using level detectors attached to the shovel in a predetermined pattern (e.g. a square pattern) such as: front left, front right, rear left and rear right,
  pressure readings at each of the jacking points,
  jack extension readings from built-in rod position detector.

In accordance with another further aspect, the jacking points are provided in the form of twin-jacks such as those described in applicant's patent application No. PCT/CA2015/051254 published under No. WO2016/086300 where a contingency exists for:
  a cylinder failure or any other hydraulic failure
  a PLC fault or any other electrical fault.

In accordance with another further aspect, the shovel is lifted as a whole to an elevation adequate for easy removal of rollers and side frames off the carbody.

According to a still further broad aspect, there is provided a method of safely lifting a shovel as a whole above ground while maintaining the level throughout the entire operation. The method comprising:
  i) Preparing ramps to provide an initial raise of the shovel using, for instance, common wooden mats and dirt from the surrounding area,
  ii) Locating a plurality of jacking points (e.g. 3 pairs) and a hydraulic power & control unit on the ground at the planned locations to fit the specific shovel to be lifted,
  iii) Connecting all lifting devices and level detectors to the hydraulic power & control unit through hydraulic hoses and electrical cables,
  iv) Driving the shovel on the ramps over the jacks and immobilizing it at the precise location needed for the lift,
  v) Attaching removable level detectors to the shovel pointing downward to the ground using commonly available means such as magnetic supports,
  vi) Using the hydraulic power & control unit with a manual mode to provide an initial extension of each jacks until such moment that contact is made with the shovel and an initial plane is set for the subsequent lift operation,
  vii) Dialing in the lifting height desired in the control unit and starting an automated lift program,
  viii) Monitoring the lift while the control unit together with the field data it receives:
    a. applies metered hydraulic power selectively at each jacking point,
    b. ensures the shovel is lifted as a whole with the current lifting plane remaining parallel to the initial plane,
    c. maintains within a certain range equal jacking pressure at each lifting locations underneath the carbody,
    d. ends the lift once either the desired height is reached or any of the jacks reaches full extension.

In accordance with a further general aspect, there is provided a method of lifting a shovel having a carbody, a dipper, and a counterweight, the method comprising: a) setting up a lifting system at a given lifting site, including adjusting the relative position of a set of lifting units to match corresponding force applying points on the carbody and the counterweight, the lifting units being operatively connected to a control unit; b) driving the shovel in position over the lifting system set-up in a); c) extending the lifting units in contact with the corresponding force applying points on the carbody and the counterweight; d) lowering the dipper onto the ground; e) establishing an initial plane for a subsequent lifting operation; and f) using the control unit, starting an automated lift program in which the shovel is raised to a desired height while being maintained level to the initial plane, the dipper remaining on the ground for the duration of the lifting operation.

In accordance with a still further general aspect, there is provided an apparatus for lifting a shovel from a ground surface, the shovel having a carbody, a dipper, and a counterweight, the apparatus comprising: a first set of lifting units positionable to match corresponding force applying points on the carbody; a second set of lifting units mounted to adjustable height stands underneath the counterweight, the adjustable height stands being displaceable between a retracted position to clear the passage of the counterweight during the positioning of the shovel over the first and second sets of lifting units and an extended position for allowing the second set of lifting units to be extended into engagement with the counterweight, the adjustable height stands being mechanically lockable in the extended position; a control unit operatively coupled to the first and second sets of lifting units and configured for providing control commands thereto; and level detectors operatively connected to the control unit.

BRIEF DESCRIPTION OF THE DRAWINGS

FIGS. 6, 6-1, 6-2 illustrate a new type of adjustable stand for the rear lifting units that provides for easy adjustment of the initial height prior to a lift operation eliminating the need to handle heavy loads while the jack/stand assembly is under the shovel;

FIG. 7 shows an adjustable support that allows the four (4) lifting units responsible to lift the carbody to be:
Set up in the proper position prior to the lift of a given shovel,
Be handled as a single unit with a single lifting machine

FIG. 9 is a side view of the same shovel ready to be lifted after the following actions have been performed:
The dipper has been lowered to the ground and the handle drive mechanism has been put on neutral,
The height of the rear jack stands has been adjusted to match this specific shovel,
Level detectors have been attached to the shovel and hooked up to the hydraulic power and control unit,
All six (6) jacks have been pre-extended until such moment where contact with the shovel has been made and an initial lift plane has been established in the PLC when:
The shovel is level to the ground,
The pressures in the four (4) jacks under the carbody are made approximately equal;

FIG. 10 is a side view showing the same shovel raised above ground through the use of the herein described lifting system showing the shovel level with the ground;

FIG. 11 is a rear view of the carbody and lifting system in the same situation as described in FIG. 9; and FIG. 12 is a rear view of the carbody and lifting system in the same situation as described in FIG. 10.

DETAILED DESCRIPTION

There is described herein an apparatus and a method to lift or raise heavy machinery. The apparatus coordinates the lifting of the heavy machinery so that it can be raised with respect to a ground surface. In so doing, the apparatus provides clearance so that vehicles and maintenance crews can access the lower ends of the heavy machinery, and suspends the heavy machinery at an elevation while the maintenance operation is being performed.

Figure 1:
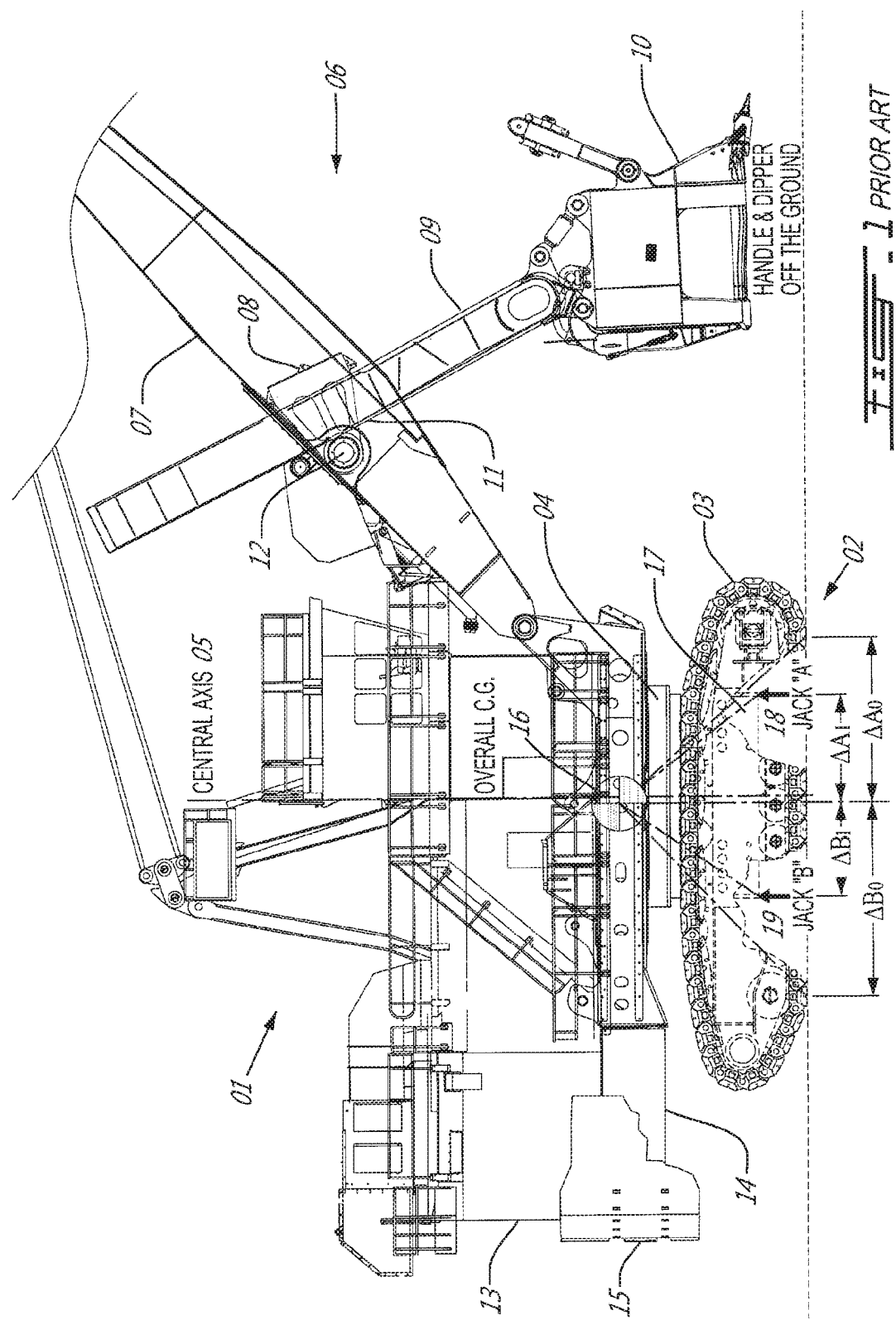
FIG. 1 is a side view showing a shovel of a type well known in the art with its lateral center of gravity (C.G.) shown approximately centered near the rotational axis of the shovel when its dipper is off the ground.

As will be seen hereinafter, the apparatus and method are particularly useful for safely lifting heavy machinery, such as mechanical or electrical shovels. FIG. 1 illustrates one example of such a shovel. The shovel generally comprises an upper part 01 secured to a lower part 02. The lower part 02 may comprise a carbody 17 having sideframe on each side. Each sideframe contains rollers which turn an endless track 03 or tread to displace the shovel on a ground surface. A rolling circle 04 is secured between the upper and lower parts 01, 02 to permit the upper part 01 to revolve 360° around the central axis 05 of the shovel in either direction left or right. In the front of the upper part 01 are mounted the front attachments 06, which usually consist of a boom 07 with a motorized handle connector frame 08, and a dipper comprising a handle 09 and a digger 10. The handle 09 is inserted in the handle connector frame 08 and can be moved up or down through a rack 11 and pinion 12 system. At the back, the shovel is provided with a counterweight including a counterweight supporting frame 14 and counterweight slabs 15.

At regular intervals, such shovels need to be lifted for servicing purposes of components of their lower part 02. For instance, the rollers of the carbody 17 need to be replaced at regular intervals. Similarly, the sideframes of the carbody 17 eventually also need repairs or replacement. This type of maintenance requires a lot of time and effort and in doing so; there is a great incentive to be able to lift the shovel as a whole in a safe and easy manner.

While it is actually possible to do so with lifts using large capacity hydraulic jacks found on the market, there is no system per se available to do so. First, the main frame of the carbody 17 is relatively small in comparison with the extent of the machine itself which creates a risk of unbalance during the lift operation. Referring to FIG. 1, the locations 18 and 19 on the main frame of the carbody 17 where the jacking equipment is set to exert an upward force sufficient to lift the whole machine is indicated by the two arrows at Jack A and Jack B. It can be easily noted that dimensions □$A_1$ and □$B_1$ are much smaller than the normal bearing extent as shown by dimensions □$A_0$ and □$B_0$ for this typical shovel. This results in a risky lifting operation and an increased difficulty of maintaining an adequate balance of the load at all times. It is therefore not a recommended setup to lift the shovel.

Figure 2:
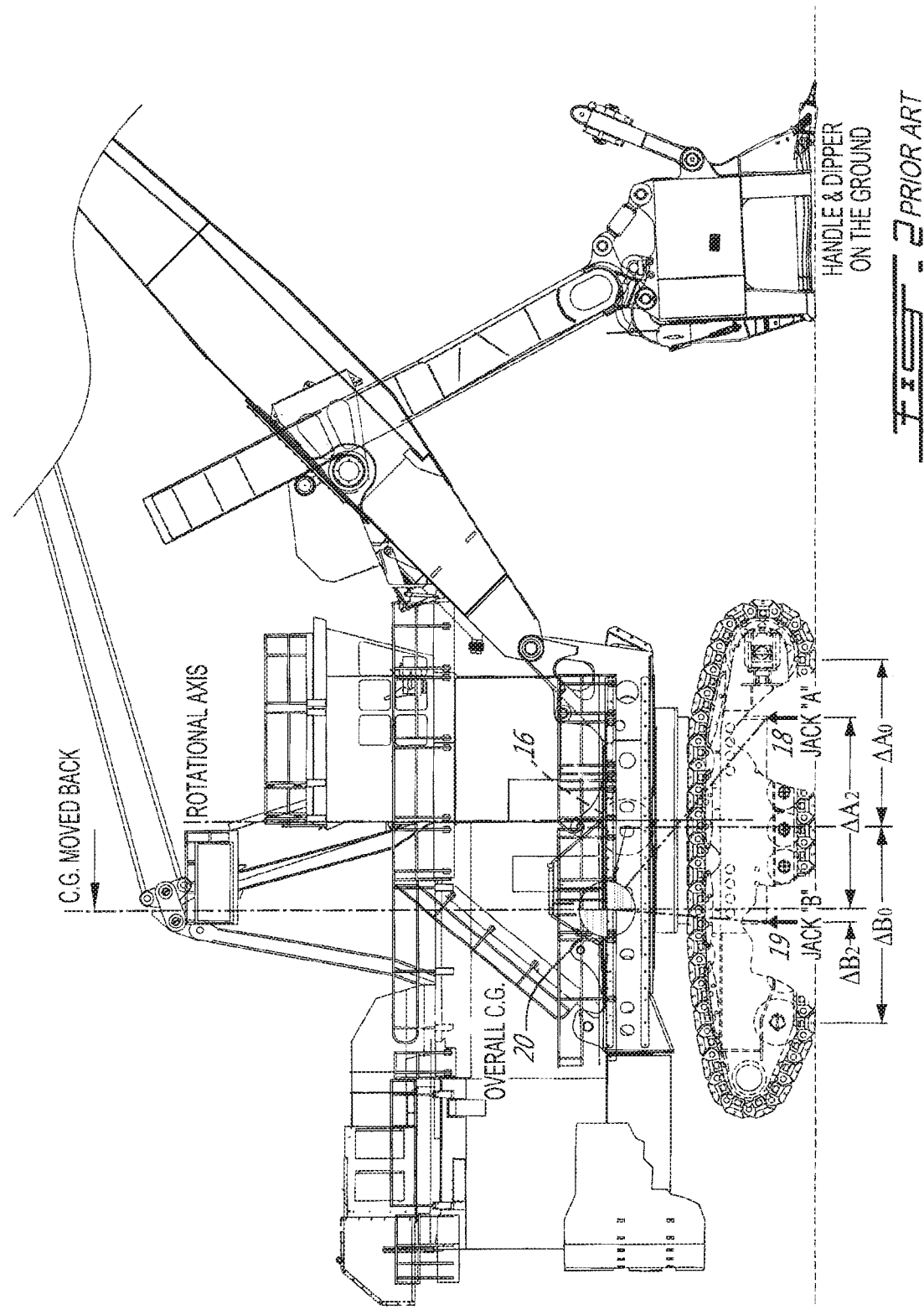
FIG. 2 is a side view showing the same shovel as in FIG. 1 when the dipper is lowered on the ground and the resulting effect of moving the C.G. toward the back of the shovel near "Jack B"

An alternative way of lifting the shovel is shown on FIG. 2. There can be seen a same typical shovel but this time with its dipper intentionally kept on the ground for the duration of the lift and maintenance operation. The goal is to reduce the overall load to be lifted in an attempt to increase the safety of the lift operation. But as can be seen, looking more closely at the physics involved reveals that this action results in the center of gravity of the shovel being shifted toward the back of the shovel. It therefore comes very close to the jacks at location "B". As a result, the load is now residing almost entirely over these rear jacks and there is almost no load left at the front Jack A. Therefore, a very high local pressure is created on the ground under the rear jacks at location "B". This pressure can easily overcome the ground bearing capacity. In such a case, the jacks could "sink" into the ground, the shovel could fall off the jacks or become off balance and the center of gravity could move beyond Jack B with the shovel therefore tipping on its back in a major accident. For this reason, this lift setup is even more dangerous and should be avoided. While it is possible to put supports underneath the counterweight of the shovel as a safety measure to block the load from tipping backwards, there still remains the fact that most of the force exerted to lift the shovel is applied in a very small area on the main frame of the carbody 17, which is by itself a risk to the structural integrity of the machine and, thus, not recommended.

Figure 3:
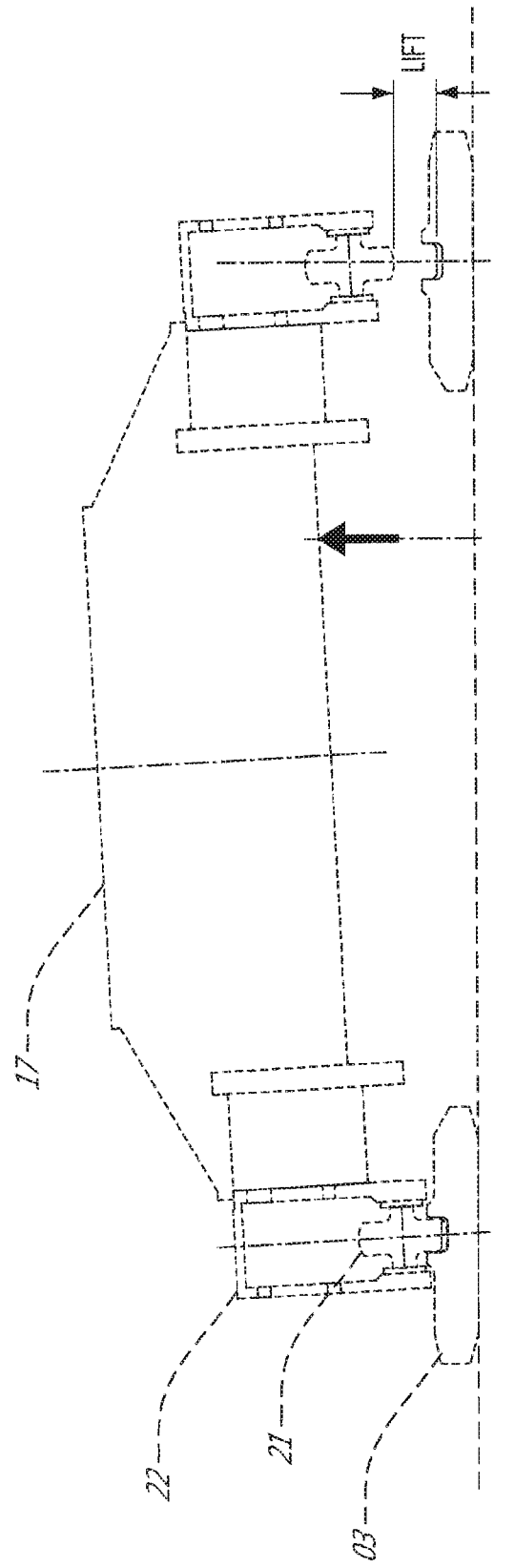
FIG. 3 shows the prior art of lifting a shovel that can be termed as a "one-side lift"

Referring to FIG. 3, it can be seen the preferred method in the prior art for replacing carbody 17 rollers 21 and side frames 22. This lifting method could be termed as the "one-side lift" method. This is the lifting of only half of the shovel. In such a lift, say to do maintenance on the right hand side frame, jacks are installed at Jack A and Jack B but only on the right hand side of the shovel when looking at it from behind. Once lifted to a sufficient elevation, maintenance work can be performed. Then, after lowering the shovel, the jacks are moved to the other side and the shovel is lifted again. This is time consuming and involves a lot of energy and additional risks (e.g. hydraulic failures and human errors). Such predicament could be avoided if the shovel was lifted as a whole from the beginning in a safely manner.

It is to be noted that for all of the lift setups described above, there remains at least two (2) major safety risks. The first is that there is no contingency in case of a jack or hydraulic failure. Any such failure can result in the shovel falling to the ground.

The second major risk is the absence of a systemized control approach. In the prior art, each jacking point is more or less independent of the other. Even if the jacks could be connected to a main panel with the control valves arranged in a way as to be close to each other thus permitting a same person to operate all four (4) jacks more or less at the same time, there still remains that the entire success of the lift rests upon the perfect or near perfect execution of the lift sequence by the lift operator. Human errors such as mistaken valve being activated, lack of attention, error in judgement, communication issues, etc. are all possible and cannot be dismissed. Any such human errors can lead to a severe imbalance of the load and potential catastrophic consequence as a result. Therefore, there is a need for lift operations be automated in order to reduce or eliminate those risks.

Figure 4:
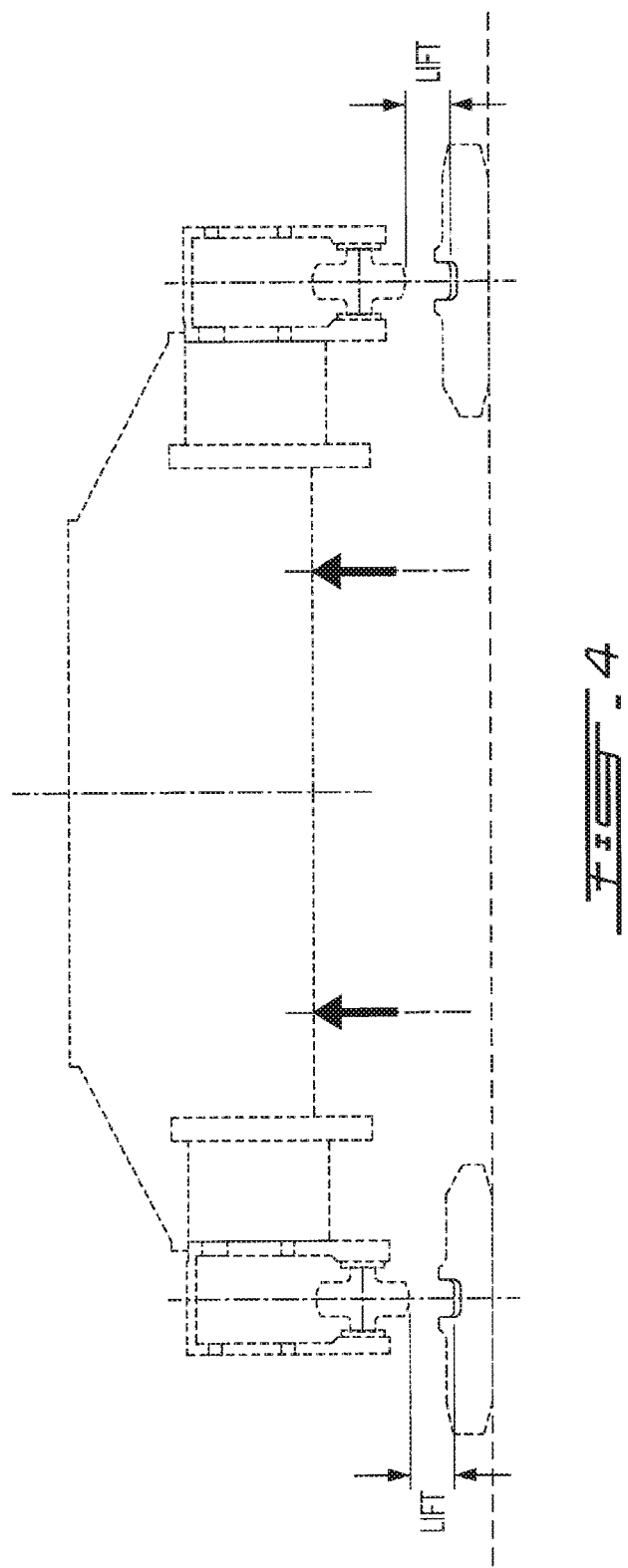
FIG. 4 shows a shovel lifting method that can be termed as an "integral lift"

Also since every lift inherently involves some element of risk, it would be preferable to lift the whole shovel all at once. That is what is depicted in FIG. 4 and we will from here refer to such a lift as an "integral" lift.

Figure 5:
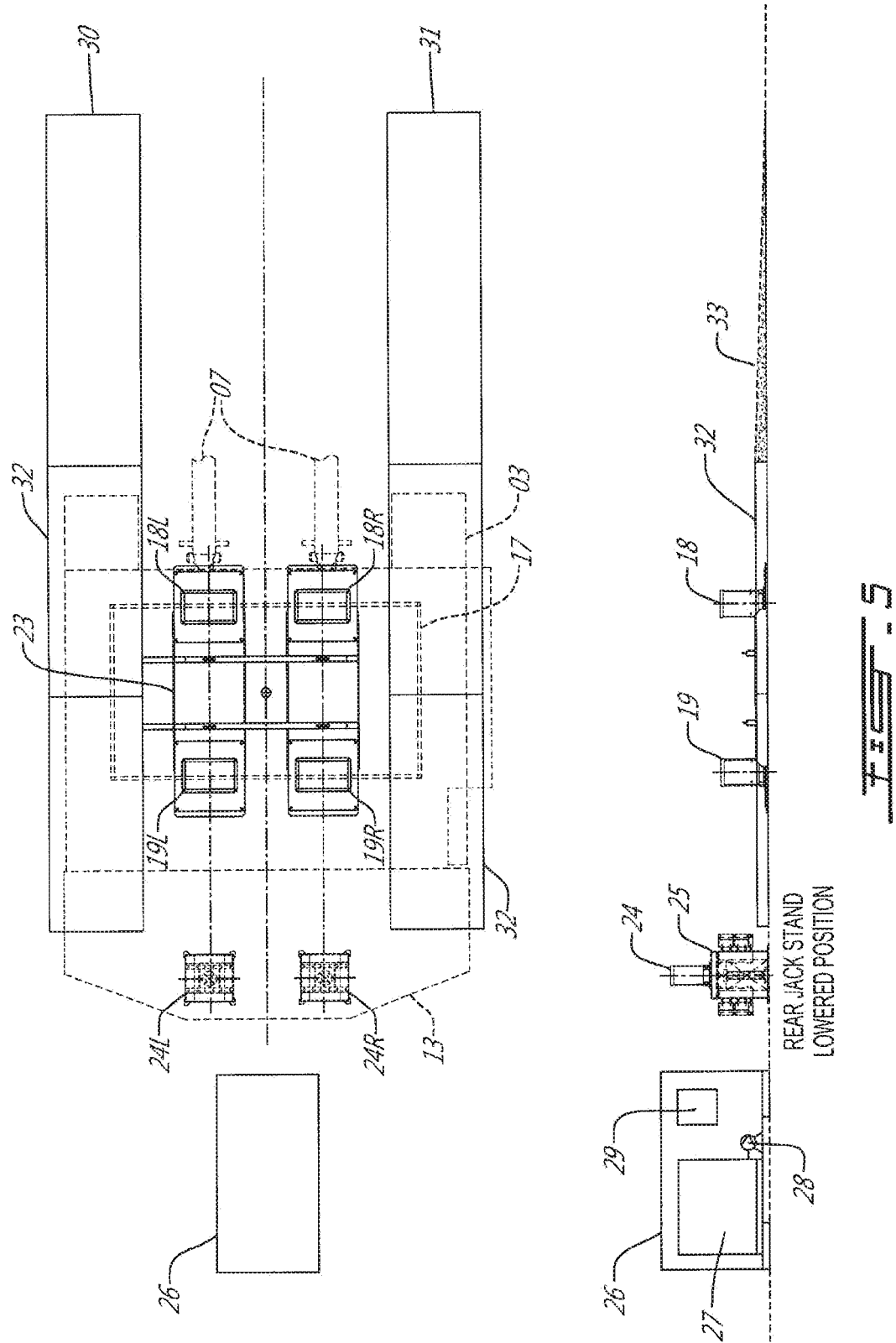
FIG. 5 shows an embodiment of the lift system complete setup prior to a lifting operation.

The setup of the new lift system will now be described with reference to FIG. 5. According to this example, four (4) lifting units 18L, 18R, 19L and 19R may be preassembled on a skid 23 (described in FIG. 7). Each lifting units can take various forms, such as hydraulic jacks and mechanical jacks. According to one example, each lifting units are provided in the form of a hydraulic twin-jack such as described in applicant's patent application PCT/CA2015/051254 published under No. WO2016/086300, the entire content of which is herein incorporated by reference for all purposes. Two (2) additional lifting units 24L and 24R are provided at the rear. The rear left and right lifting units 24L and 24R are configured and positioned to push under the supporting frame 14 of the counterweight box 13 of the shovel. Since frame 14 is higher from the ground than the carbody, stands 25 are used to support the lifting units 24L and 24R. The stands 25 herein shown have an adjustable height to eliminate the risk of interference with the counterweight slabs 15 when the shovel is displaced over the pre-set lifting system. Those adjustable height stands 25 will be described hereinafter in more detail with reference to FIG. 6. Also located at the rear is the hydraulic power and control unit 26. Broadly, its main components may include a hydraulic fluid tank 27, a hydraulic pump 28 and a Control Panel 29 which comprises control logic such as a programmable logic controller (PLC) along with other components used for the execution of the lift. Completing the lift setup are two (2) optional ramps of which one is located on the left side 30 and the other on the right side 31 of the skid 23. Ramps 30, 31 can be made of commonly available 12-inches wooden mats 32 and a gentle slope 33 is built using dirt from the surroundings to ease the climbing of the shovel over the mats.

The adjustable stands 25 will now be discussed. It is common for shovels to have large steel slabs 15 attached to the back of their counterweight box 13. These slabs extend several inches lower than the counterweight box supporting frame 14. Since it is required during a lift to apply the lifting force on this frame 14 and since the shovel may be driven backwards over the lifting system in the steps of the initial lift setup, those slabs 15 may constitute an interference with the rear lifting units 24. Various ways of managing this situation are possible but they all entail handling heavy weights such as shim blocks or plates while under the shovel. Since access from above is non-existent due to the shovel, cranes cannot be used and mine maintenance personnel must resort to more difficult/risky ways of adjusting the final height of the rear lifting units.

Now referring to FIG. 6, the adjustable height stands 25 have been designed to provide an easy way to set the working height of the rear lifting units 24 throughout a lift operation. The stands 25 can be customized for any mine's specific variety of shovels. For instance, each stands 25 may be made of four (4) main components: an inner structure 34, an outer structure 35, a hydraulic cylinder 36 and, in the illustrated example, four (4) shim blocks of each type 37A, 37B and 37C. The exemplary inner structure 34 shown in FIG. 6-1 comprises four (4) structural columns 38 squarely held together with bracings 39 and secured to a base plate 40. The exemplary outer structure 35 shown in FIG. 6-2 is an open-box type structure which is made of steel plates 41, 50 and 51. Hinges 42 are welded or otherwise suitably mounted to the outer structure to support the shim block 37A, 37B and 37C. A clevis 43 is also welded or otherwise suitably attached to the inner surface top steel plate 51 for attachment to the distal end of the rod of the hydraulic cylinder 36. The shim blocks 37A, 37B and 37C are made of either thick plate or of the same material used for the columns 38 of the inner structure 34. The height of the shims 37A, 37B and 37C is made to fit the different models of shovels to be lifted. Although three (3) varieties of shim blocks are shown here, it is understood there can be any number of these blocks as needed to adapt to all the shovels of a particular mine. The last component of the stand 25 is the hydraulic cylinder 36, which may be a commonly available item in the art that can be customized again for the specific needs of the shovels to be lifted.

The functioning of the stand 25 will now be explained. Initially, the stand is set in the fully lowered position. To adapt the stand to the height of shovel type 1, hydraulic pressure is applied to the cylinder 36 in order to raise the outer structure 35 until the first shim blocks 37A can be rotated inside the outer structure 35. The shim blocks can, for instance, be secured to the outer structure 35 with the use of bolts. Hydraulic pressure is then released from the cylinder 36 for the outer structure 35 to be supported only by the inner structure 34 through the shim blocks 37A that have been inserted. If in another instance the stand needs to be adjusted to a higher shovel of type 2, then the same is done but shim blocks 37B are also inserted inside, secured, and so on for shovel type 3 with the addition of shim blocks 37C. More shim blocks can be added if needed to adapt to more shovels. For each exemplified stand, the outer structure 35 is fully supported by the inner structure 34, not the hydraulic cylinder 36 of the stand 25. The hydraulic cylinder is just used to displace the outer structure relative to the inner structure from one discrete position to the next. Once in position, the shim blocks 37 hold the outer structure in position relative to the inner structure.

Referring now to FIG. 7, there is shown the adjustable skid. This skid is another optional tool designed to help the maintenance personnel quickly setting up the lift system for different types of shovel. To adapt to a certain model of shovel, the lifting units 18L, 18R, 19L and 19R to be installed under the carbody 17 of the shovel must be installed at a certain distance from each other in both directions (left/right and front/back). To do so, the jacks are installed in pairs and secured on two (2) skid plates 44L and 44R. These skid plates can be reinforced with ribs 45. While a longitudinal arrangement of the skids is shown in this figure, it can be noted that a lateral arrangement could equally be done if desired. There also can be any number of sets of holes 46 drilled in order to provide longitudinal adjustability for the precise location of the lifting units to match any model of shovel to be lifted. Both skid plates 44L and 44R are secured together with two (2) handling beams 47. The beams 47 are provided with sets of holes or slots for receiving locking pins (not shown). The locking pins are used to secure the beams 47 to the skid plates 44L, 44R. A number of holes can be longitudinally distributed along the beams to provide the lateral adjustability required to fit the different models of shovels in a particular mine. Since the required location of the lifting units is known for each shovel, this allows to perform these adjustments long in advance in a proper settlement. Once these adjustments are completed for the intended lift, the skid can be moved to the lift site and there, through the use of the handling beams, be lifted and positioned as a whole through the use of a crane. Then, the handling beams can be detached quickly from the skid plates 44L, 44R by removing the locking pins and stored nearby. Removing the beams is optional but can be desired to allow for easy access and egress underneath the carbody when the shovel is positioned over the skid.

Alternatively, the lifting units could be mounted on individual base plates (not shown). Markers and jigs could be used to properly position the lifting units relative to on another. According to one example, each lifting module could be mounted on a 6'×8' metal base plate.

Figure 8:
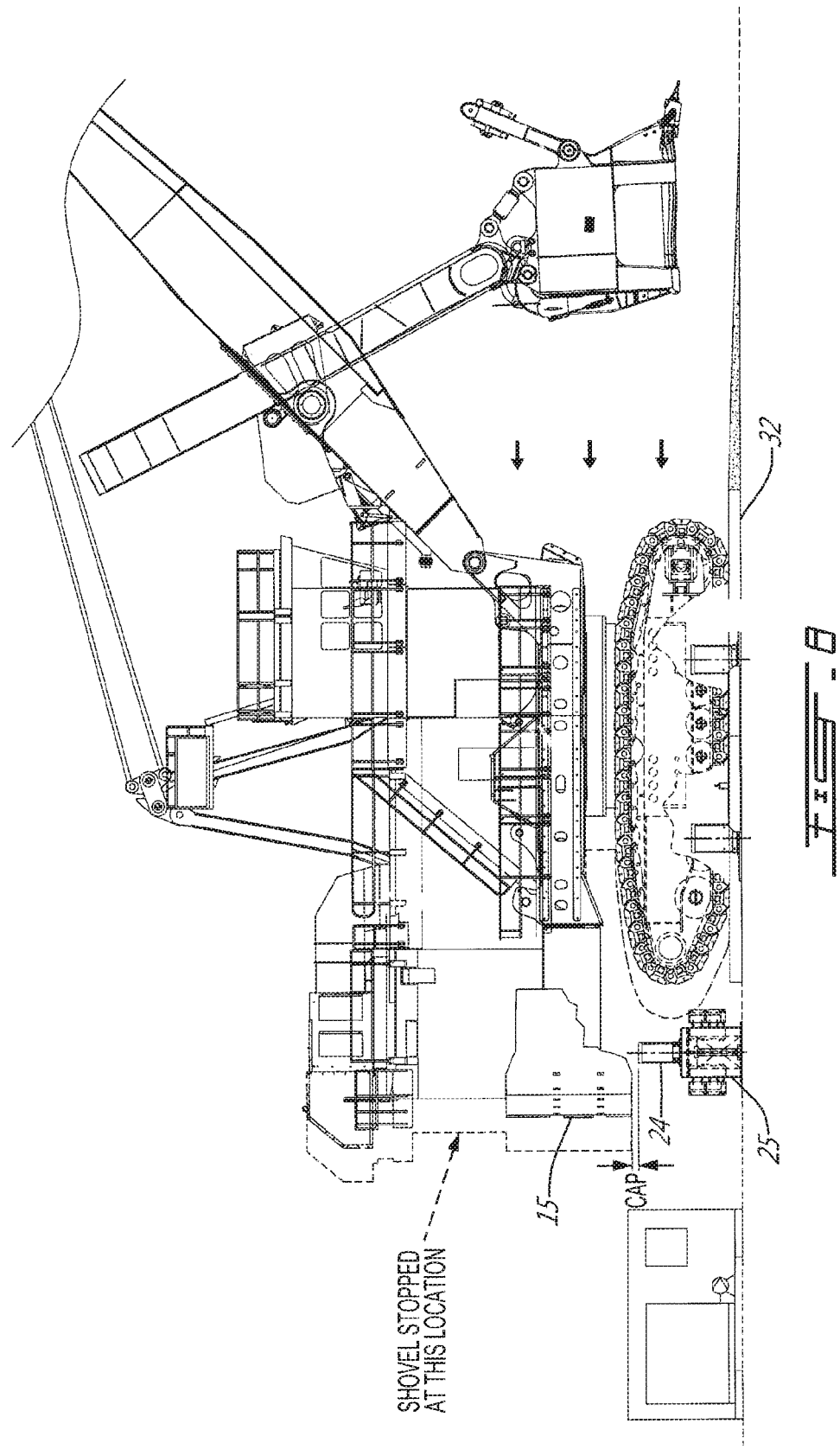
FIG. 8 is a side view of the same shovel being driven backwards over the lifting system without interfering with any of its components.

FIG. 8 illustrates the shovel in the process of being driven backwards on top of the wooden mats 32. The rear jack stands 25 are fully lowered during this step which provides the necessary clearance under the counterweight slabs 15 for the shovel to move without interference over the rear jacks 24.

Now referring to FIG. 9, there is shown the shovel immobilized in position to be lifted with the lifting units 18L, 18R, 19L, 19R precisely aligned with corresponding predetermined force applying or lifting points on the carbody 17 and the additional lifting units 24L, 24R properly positioned underneath the counterweight frame 14. The handle 11 and the digger 10 are then lowered on the ground, as depicted by the arrows in FIG. 9. The handle and digger assembly (i.e. the dipper) will remain on the ground throughout the lifting operation. To do so, the pinion 12 of the handle drive is put on neutral so that it will move freely inside the motorized handle connector frame 08 during the lifting operation. The rear jack stands 25 have been extended as explained in FIG. 6 and rear jacks 24 have been extended to make contact with the bottom side of the supporting frame 14 of the counterweight box 13. Similarly, the four (4) jacks located under the carbody have been extended to make contact with the bottom of the carbody main frame 17 after shim plates 50 have been inserted on top of the jacks. Also shown are front 48 and rear 49 level detectors may be installed on the shovel with temporary mountings such as commonly available magnetic supports. The level detectors 48, 49 are constantly reading the distance to the ground and sending the information to the PLC to which they are operatively linked. The PLC can also be operatively connected to stroke sensors provided on each lifting jack for measuring their extension. Looking now at the arrangement of the lifting units, it can be seen that this arrangement provides an excellent longitudinal stability as evidenced by dimension $\Delta A_3$ being greater than dimension $\Delta A_0$ and dimension $\Delta B_3$ greater than $\Delta B_0$.

Referring to FIG. 10, there will now be explained the lift control strategy. Prior to the lift, center of gravity calculations have been made using information from the shovel manufacturer to determine its location and magnitude. With this info, it is possible to determine the reactions that will be induced during the lifting operation at the locations where the lifting units will be installed. With the goal of minimizing reactions through the carbody, the lifting case to consider is the one where the reactions at the front and the middle lifting units 18L, 18R, 19L, 19R are approximately equal. Once these target reactions are known, the control strategy can be applied as follows:

1—PLC applies even pressure to the front and middle lifting units 18L, 18R, 19L, 19R to produce the upward force determined in the calculations. The shovel is not moving at this point since the amount of force is less than the load to be lifted.

2—PLC applies pressure to the rear lifting units 24L, 24R until movement is detected at any of the four (4) level detectors 48L, 48R, 49L, 49R.

3—PLC records the distances returned at that instant by the detectors 48L, 48R, 49L, 49R and keep them in memory. This sets the initial lifting plane.

4—PLC applies excess pressure to the front and rear lifting units 18L, 18R, 24L, 24R while the initial pressure at the middle jacks 19L, 19R is maintained. The shovel now is moving up.

5—While in movement, PLC constantly reads the distances sensed by the level detectors 48, 49 and compares those distances to the initial plane.

6—If any of the two (2) front lifting units 18L, 18R or two (2) rear jacks 24L, 24R accumulate a lag greater than a certain acceptable value, PLC temporarily stops the three (3) quicker lifting units until the slower one closes its accumulated gap. Then, PLC restarts the three (3) lifting units that were stopped.

7—This is done as many times as required until maximum extension is reached by any of the four (4) lifting units 18L, 18R, 24L 24R.

8—During the whole duration, the middle lifting units 19L, 19R are operating as slaves and they simply receive a constant amount of pressure.

To lower the shovel to the ground, a similar method is applied:

1—PLC records the distances of the four (4) detectors 48, 49 and sets the initial plane.

2—Equal pressure is applied to front and middle lifting units 18L, 18R, 19L, 19R as per initial calculations.

3—PLC commands front and rear lifting units 18L, 18R, 24L, 24R lower while monitoring distances from the detectors 48, 49.

4—If a lifting unit accumulates a lag greater than a certain amount, the other lifting units are stopped temporarily waiting for the slower lifting units to catch up. Once done, the lifting units are restarted down again.

5—This goes on until the shovel is fully lowered to the ground or at an intermediate level if so desired.

It is to be finally discussed the location of the level detectors 48 and 49. These detectors are installed sufficiently far away from the lifting units 18L, 18R, 19L, 19R, 24L, 24R so as to ensure that their readings will never be influenced by eventual ground settling happening locally underneath the lifting units if ground bearing capacity is temporarily exceeded. If ground settling does in fact happen, the PLC will identify that a certain level detector measurement does not correspond to the measurement of the other detectors installed on the shovel. Therefore, the PLC will pause all the lifting units except the one affected by ground settling until it catches on. When the ground is stable again, the PLC will detect movement of the shovel and then proceed to restart the other lifting units and the lift operation will continue. Such level detectors may be used in addition to stroke sensors (not shown) provided on each jack for measuring the extension thereof. In some situations, it may be useful to use both type of level detectors (i.e the ones on the shovel and the stroke extension sensors on the jacks) in parallel in order to better detect any potential ground settling under one or more of the lifting units.

The above description is meant to be exemplary only, and one skilled in the art will recognize that changes may be made to the embodiments described without departing from the scope of the invention disclosed. Any modifications which fall within the scope of the present invention will be apparent to those skilled in the art, in light of a review of this disclosure, and such modifications are intended to fall within the appended claims.

The invention claimed is:

1. A method of lifting a shovel having a carbody, a dipper, and a counterweight, the method comprising:
    a) configuring the shovel and a lifting system including lifting units on a lifting site in a relative position wherein a set of lifting units matches corresponding force applying points on the carbody and the counterweight, the set of lifting units being operatively connected to a control unit;
    b) extending the set of lifting units in contact with the corresponding force applying points on the carbody and the counterweight;
    c) lowering the dipper mounted to the shovel onto a supporting surface; and
    d) starting a lifting operation to raise the shovel to a desired height while the dipper, mounted to the shovel, remains on the supporting surface for a duration of the lifting operation.

2. The method of claim 1, wherein the control unit comprises a programmable logic controller (PLC), and wherein d2) comprises monitoring each of the lifting units and operating them in unison through use of the PLC, and wherein the PLC processes field data to control the operation of each of the lifting units so as to at least one of: maintain a current lifting plane parallel to the initial plane, compensate for local ground settling, and maintain an even pressure in the lifting units underneath the carbody to minimize the reactions to the carbody, and wherein the field data include at least one of: distance measurements using level detectors, pressure reading at each of the lifting units, and jack extension readings from rod position sensors.

3. The method defined in claim 1, comprising attaching removable detectors to the shovel sufficiently far away from the lifting units so as to ensure that their readings are not distorted by possible ground settling happening locally underneath the lifting units if ground bearing capacity is ever exceeded, the detectors pointing downward to the ground and continually reading the distance to the ground and sending the sensed information to the control unit.

4. The method of claim 1, wherein b) using a manual mode of the control unit to provide an initial extension of each of the lifting units until the lifting units engage the shovel.

5. The method of claim 1, wherein the supporting surface is the ground and the dipper comprises a handle, a digger and a handle drive mechanism for allowing the handle to move up and down, and wherein after c) the handle drive mechanism is set to a neutral state to allow the dipper to remain on the ground for the entire duration of the lift operation.

6. The method of claim 1, wherein starting the lifting operation comprises:
    d1) establishing an initial plane for the lifting operation; and
    d2) using the control unit, starting an automated lift program in which the shovel is raised to the desired height while being maintained level to the initial plane.

7. The method of claim 6, prior to the lifting operation, determining a location and magnitude of a center of gravity of the shovel and using information on the center of gravity to determine reactions induced at the lifting units during the lifting operation.

8. The method of claim 7, wherein a) comprises preparing ramps to provide an initial raise of the shovel prior to driving the shovel into position over the lifting system set up at the lifting site.

9. The method of claim 7, wherein the set of lifting units comprises at least a pair of front lifting units, a pair of middle lifting units, and a pair of rear lifting units, the pairs of front and middle lifting units being located underneath the carbody, the pair of rear lifting units being located underneath the counterweight, and wherein the method comprises configuring the control unit to maintain the reactions at the front and middle lifting units generally equal.

10. The method of claim 9, wherein d2) comprises applying an even initial pressure to the front and middle lifting units to produce a pre-calculated upward force less than a load to be lifted.

11. The method of claim 10, further comprising installing level detectors on the shovel and operatively linking the level detectors to the control unit prior to d1), and wherein d2) further comprises d2a) applying pressure to the pair of rear lifting units until movement is detected at any one of the level detectors.

12. The method of claim 11, wherein d1) comprises recording distances returned by the level detectors when the movement is initially detected.

13. The method of claim of claim 11, wherein after d2a), applying excess pressure to the pairs of front and rear lifting units while the initial pressure at the pair of middle lifting units is maintained.

14. The method of claim 13, while the shovel is moving up continuously reading the distances measured by the level detectors and comparing said distances to the initial plane and, if any one of the front lifting units or the rear lifting units accumulates a lag greater than a predetermined acceptable value, temporarily stopping the other ones of the front and rear lifting units until the lagging lifting unit catch up with the other ones of the front and rear lifting units.

15. The method of claim 14, wherein during an entire lifting operation, the middle lifting units receive a constant amount of pressure.

16. The method of claim 9, wherein a) comprises mounting the rear lifting units on adjustable stands and driving the shovel into position over the lifting system set up at the lifting site, and wherein, prior to driving the shovel into position over the lifting system, the adjustable stands are held in a lowered position and, following driving the shovel into position over the lifting system, expanding the adjustable stands to an extended position, and mechanically locking the adjustable stands in said extended position.

17. The method of claim 16, wherein each of the adjustable stands comprises an inner structure, an outer structure vertically displaceable relative to the inner structure, a hydraulic cylinder between the inner and outer structures, and shim blocks insertable between the inner and outer structures, and wherein mechanically locking comprises inserting the shim blocks between the inner structure and the outer structure of the adjustable stands.

18. The method of claim 16, wherein a) comprises pre-assembling the lifting units, which are to be positioned underneath the carbody, on an adjustable skid and adjusting the position of the lifting units along both front/back and left/right directions prior to driving the shovel into position over the lifting system set up at the lifting site, wherein the adjustable skid comprises a pair of skid plates adjustably connected to one another by handling beams, each skid plates defining a series of holes to allow the lifting units to be secured at different locations over the surface of the skid plates.

19. An apparatus for lifting a shovel from a ground surface, the shovel having a carbody, a dipper, and a counterweight, the apparatus comprising:
a first set of lifting units positionable to match corresponding force applying points on the carbody;
an adjustable skid comprising a pair of skid plates adjustably mounted to transversal beams, the first set of lifting units being adjustably mounted to the adjustable ski, and wherein each skid plate has a plurality of holes defined thereon for allowing the first set of lifting units to be installed at various positions thereover;
a second set of lifting units mounted to adjustable height stands underneath the counterweight, the adjustable height stands being displaceable between a retracted position to clear a passage of the counterweight during a positioning of the shovel over the first and second sets of lifting units and an extended position for allowing the second set of lifting units to be extended into engagement with the counterweight, the adjustable height stands being mechanically lockable in the extended position;
a control unit operatively coupled to the first and second sets of lifting units and configured for providing control commands thereto; and
level detectors operatively connected to the control unit.

20. The apparatus of claim 19, wherein the first set of lifting units comprises at least a front pair of lifting units and a middle pair of lifting units, and wherein the second set of lifting units comprises at least a rear pair of lifting units, thereby providing at least three transversal lines of action underneath the shovel, including one line of action underneath the counterweight.

21. The apparatus of claim 19, wherein the adjustable height stands each comprises an inner structure, an outer structure vertically displaceable relative to the inner structure, a hydraulic cylinder between the inner and outer structures and shim blocks insertable between the inner and outer structures.

22. The apparatus of claim 21, wherein the inner structure comprises four corner columns projecting from a base plate and held together with bracings and wherein the outer structure has an open-box configuration, the shim blocks being pivotally mounted to hinges provided on the outer structure, and wherein the shim blocks comprises at least two vertically spaced-apart sets of shim blocks.

23. The apparatus of claim 19, further comprising ramps on opposed lateral sides of the first set of lifting units to provide an initial raise of the shovel.

24. The apparatus of claim 19, wherein the first set of lifting units comprises at least a front pair of lifting units and a middle pair of lifting units, and wherein the second set of lifting units comprises at least a rear pair of lifting units, wherein the control unit comprises a programmable logic controller (PLC) configured to evenly apply an initial pressure to the front and middle pairs of lifting units and configured to at least one of: apply pressure to the rear pair of lifting units until movement is detected at any of the level detectors and apply additional pressure to the front and rear pairs of lifting units while the initial pressure at the middle pair of lifting units is maintained.

25. The apparatus of claim 19, wherein the level detectors are detachably mounted to the shovel and configured to measure a distance from the ground.

26. An apparatus for lifting a shovel from a ground surface, the shovel having a carbody, a dipper, and a counterweight, the apparatus comprising:
a first set of lifting units positionable to match corresponding force applying points on the carbody, wherein the first set of lifting units comprises at least a front pair of lifting units and a middle pair of lifting units;
a second set of lifting units mounted to adjustable height stands underneath the counterweight, the second set of lifting units comprises at least a rear pair of lifting units, the adjustable height stands being displaceable between a retracted position to clear a passage of the counterweight during a positioning of the shovel over the first and second sets of lifting units and an extended position for allowing the second set of lifting units to be extended into engagement with the counterweight, the adjustable height stands being mechanically lockable in the extended position;

a control unit operatively coupled to the first and second sets of lifting units and configured for providing control commands thereto, the control unit comprising a programmable logic controller (PLC) configured to evenly apply an initial pressure to the front and middle pairs of lifting units; and level detectors operatively connected to the control unit, the programmable logic controller being configured to at least one of: apply pressure to the rear pair of lifting units until movement is detected at any of the level detectors and apply additional pressure to the front and rear pairs of lifting units while the initial pressure at the middle pair of lifting units is maintained.

* * * * *